United States Patent
Leonard et al.

(10) Patent No.: US 8,465,654 B2
(45) Date of Patent: Jun. 18, 2013

(54) FILTER CANDLE AND MESH PACK WITH A DEFORMABLE SEAL, AND METHOD OF FILTERING MOLTEN OR DISSOLVED POLYMERS

(75) Inventors: Philippe Leonard, Soumagne (BE); Stefan Vandendijk, Tongeren (BE)

(73) Assignee: Bekaert Advanced Filtration SA, Sprimont (BE)

( * ) Notice: Subject to any disclaimer, the term of this patent is extended or adjusted under 35 U.S.C. 154(b) by 340 days.

(21) Appl. No.: 12/919,066

(22) PCT Filed: Feb. 2, 2009

(86) PCT No.: PCT/EP2009/051149
§ 371 (c)(1),
(2), (4) Date: Aug. 24, 2010

(87) PCT Pub. No.: WO2009/109435
PCT Pub. Date: Sep. 11, 2009

(65) Prior Publication Data
US 2011/0006015 A1 Jan. 13, 2011

(30) Foreign Application Priority Data
Mar. 7, 2008 (EP) .................................. 08152460

(51) Int. Cl.
*B01D 37/00* (2006.01)
*B01D 29/15* (2006.01)

(52) U.S. Cl.
USPC ........ 210/767; 210/232; 210/236; 210/323.2; 210/457; 210/483; 210/497.01; 210/774

(58) Field of Classification Search
None
See application file for complete search history.

(56) References Cited

U.S. PATENT DOCUMENTS

| | | | | |
|---|---|---|---|---|
| 2,398,399 A | * | 4/1946 | Alexander | 277/619 |
| 2,559,133 A | * | 7/1951 | Schultz | 210/458 |
| 2,726,769 A | * | 12/1955 | Cresswell | 210/441 |
| 2,789,699 A | * | 4/1957 | Pistor | 210/448 |
| 2,980,257 A | * | 4/1961 | Paton | 210/223 |

(Continued)

FOREIGN PATENT DOCUMENTS

| EP | 0319959 A2 | 6/1989 |
|---|---|---|
| EP | 325910 A1 * | 8/1989 |

(Continued)

OTHER PUBLICATIONS

Examination Report of EPO regarding EP 09 717 205.0-2113, Dec. 7, 2011.

(Continued)

Primary Examiner — Robert James Popovics
(74) *Attorney, Agent, or Firm* — Bacon & Thomas, PLLC

(57) ABSTRACT

An elongate mesh pack for filtering a fluid defines a mesh pack axial opening. The mesh pack comprises a filter medium for filtration of the fluid and has an end fitting securely fixed to the filter medium, the end fitting providing a first extremity of the mesh pack. The end fitting has an inner surface defining an end fitting opening through the end fitting, the end fitting opening being co-axial with the axial opening of the mesh pack. The end fitting comprises an annular recess encompassing the end fitting opening. A partition wall suitable to deform towards the recess under radial force is provided between the recess and the end fitting opening, the partition wall forming at least part of the inner surface.

9 Claims, 3 Drawing Sheets

U.S. PATENT DOCUMENTS

| | | | | |
|---|---|---|---|---|
| 3,187,896 | A * | 6/1965 | Wilkinson | 210/130 |
| 3,189,179 | A * | 6/1965 | McMichael | 210/238 |
| 3,225,929 | A * | 12/1965 | Sicard | 210/232 |
| 3,231,089 | A * | 1/1966 | Thornton | 210/130 |
| 3,379,000 | A | 4/1968 | Webber et al. | |
| 3,390,890 | A * | 7/1968 | Kurtz | 277/625 |
| 3,510,140 | A * | 5/1970 | Hermann | 277/604 |
| 3,557,963 | A * | 1/1971 | Offer | 210/443 |
| 3,567,023 | A * | 3/1971 | Buckman et al. | 210/130 |
| 3,594,012 | A * | 7/1971 | Whittaker et al. | 277/560 |
| 3,622,007 | A * | 11/1971 | Pappathatos | 210/355 |
| 3,675,777 | A * | 7/1972 | Heskett et al. | 210/232 |
| 3,677,412 | A * | 7/1972 | Connor | 210/440 |
| 3,680,706 | A * | 8/1972 | Baer et al. | 210/238 |
| 3,685,659 | A * | 8/1972 | Heskett et al. | 210/444 |
| 3,730,347 | A * | 5/1973 | Giampalmi et al. | 210/266 |
| 3,836,005 | A * | 9/1974 | Bauer | 210/266 |
| 3,847,819 | A * | 11/1974 | Firth | 210/444 |
| 3,882,024 | A * | 5/1975 | Holmes et al. | 210/321.8 |
| 3,893,919 | A * | 7/1975 | Flegel et al. | 210/166 |
| 3,912,630 | A * | 10/1975 | Reighard et al. | 210/130 |
| 3,933,358 | A * | 1/1976 | Hoer | 277/637 |
| 4,014,556 | A * | 3/1977 | Anderson | 277/626 |
| 4,074,985 | A * | 2/1978 | Willas | 55/498 |
| 4,074,986 | A * | 2/1978 | Frahm et al. | 55/502 |
| 4,083,409 | A * | 4/1978 | Barrington | 166/320 |
| 4,103,901 | A * | 8/1978 | Ditcher | 277/606 |
| 4,108,446 | A * | 8/1978 | Lloyd | 277/619 |
| 4,159,197 | A * | 6/1979 | Schuler et al. | 55/379 |
| 4,168,237 | A * | 9/1979 | Pickett et al. | 210/440 |
| 4,182,519 | A * | 1/1980 | Wilson | 277/616 |
| 4,223,895 | A * | 9/1980 | Roberts et al. | 277/625 |
| 4,298,206 | A * | 11/1981 | Kojima | 277/626 |
| 4,350,592 | A * | 9/1982 | Kronsbein | 210/450 |
| 4,371,177 | A * | 2/1983 | Bahr et al. | 277/560 |
| 4,419,234 | A * | 12/1983 | Miller et al. | 210/232 |
| 4,460,468 | A * | 7/1984 | Morgan | 210/445 |
| 4,473,471 | A * | 9/1984 | Robichaud et al. | 210/443 |
| 4,488,965 | A * | 12/1984 | Muller et al. | 210/232 |
| 4,510,664 | A * | 4/1985 | Lock | 29/450 |
| 4,582,330 | A * | 4/1986 | Lew et al. | 277/587 |
| 4,594,161 | A * | 6/1986 | Goto | 210/321.87 |
| 4,634,527 | A * | 1/1987 | Marshall | 210/232 |
| 4,690,414 | A * | 9/1987 | Haaland | 277/616 |
| 4,698,154 | A * | 10/1987 | Mohn et al. | 210/232 |
| 4,700,670 | A * | 10/1987 | Schade | 123/196 A |
| 4,724,113 | A * | 2/1988 | Lee | 264/276 |
| 4,739,899 | A * | 4/1988 | Thompson et al. | 220/240 |
| 4,812,235 | A * | 3/1989 | Seleman et al. | 210/247 |
| 4,818,397 | A * | 4/1989 | Joy | 210/232 |
| 4,832,844 | A * | 5/1989 | Ayers | 210/440 |
| 4,834,885 | A * | 5/1989 | Misgen et al. | 210/440 |
| 4,849,103 | A * | 7/1989 | Schmidt et al. | 210/323.2 |
| 4,891,134 | A * | 1/1990 | Vcelka | 210/359 |
| 4,921,607 | A * | 5/1990 | Langley | 210/266 |
| 4,982,928 | A * | 1/1991 | Avelov | 251/118 |
| 4,990,253 | A * | 2/1991 | Vcelka | 210/359 |
| 4,991,858 | A * | 2/1991 | Abila et al. | 277/606 |
| 5,009,435 | A * | 4/1991 | Villanyi et al. | 277/552 |
| 5,015,375 | A * | 5/1991 | Fleck | 210/232 |
| 5,027,886 | A | 7/1991 | Strom-Olsen et al. | |
| 5,193,703 | A * | 3/1993 | Staats et al. | 220/203.01 |
| 5,209,845 | A * | 5/1993 | Sims | 210/232 |
| 5,211,846 | A * | 5/1993 | Kott et al. | 210/232 |
| 5,256,312 | A * | 10/1993 | Letersky | 210/767 |
| 5,277,807 | A * | 1/1994 | Lavoie et al. | 210/321.74 |
| 5,279,733 | A * | 1/1994 | Heymans | 210/232 |
| 5,301,958 | A * | 4/1994 | Covington | 277/641 |
| 5,316,678 | A * | 5/1994 | Heaslip | 210/486 |
| 5,372,730 | A * | 12/1994 | Warner et al. | 210/791 |
| 5,399,264 | A * | 3/1995 | Pulek et al. | 210/450 |
| 5,417,442 | A * | 5/1995 | Jornhagen | 277/626 |
| 5,447,627 | A * | 9/1995 | Loafman et al. | 210/316 |
| 5,456,828 | A * | 10/1995 | Tersi et al. | 210/184 |
| 5,470,487 | A * | 11/1995 | Staats et al. | 210/767 |
| 5,474,586 | A * | 12/1995 | Eaton et al. | 55/341.1 |
| 5,484,539 | A * | 1/1996 | Tersi et al. | 210/774 |
| 5,498,333 | A * | 3/1996 | Canther | 210/198.1 |
| 5,507,504 | A * | 4/1996 | Neumann et al. | 277/322 |
| 5,525,226 | A * | 6/1996 | Brown et al. | 277/641 |
| 5,552,047 | A * | 9/1996 | Oshida et al. | 210/321.8 |
| 5,556,440 | A * | 9/1996 | Mullins et al. | 55/498 |
| 5,565,097 | A * | 10/1996 | Hayday | 210/167.31 |
| 5,605,625 | A * | 2/1997 | Mills | 210/232 |
| 5,607,585 | A * | 3/1997 | Hobrecht et al. | 210/316 |
| 5,626,349 | A * | 5/1997 | Sutherland et al. | 277/605 |
| 5,669,949 | A * | 9/1997 | Dudrey et al. | 55/486 |
| 5,671,928 | A * | 9/1997 | Lanyi et al. | 277/461 |
| 5,678,230 | A * | 10/1997 | Bryan et al. | 588/1 |
| 5,685,985 | A * | 11/1997 | Brown et al. | 210/450 |
| 5,725,784 | A * | 3/1998 | Geibel et al. | 210/791 |
| 5,779,903 | A * | 7/1998 | Smith et al. | 210/440 |
| 5,797,973 | A * | 8/1998 | Dudrey et al. | 55/372 |
| 5,800,584 | A * | 9/1998 | Hinderer et al. | 55/482 |
| 5,811,002 | A * | 9/1998 | Felber | 210/315 |
| 5,849,375 | A * | 12/1998 | Smith et al. | 428/34.5 |
| 5,851,267 | A * | 12/1998 | Schwartz | 96/7 |
| 5,876,601 | A * | 3/1999 | Geibel et al. | 210/493.1 |
| 5,904,357 | A * | 5/1999 | Demirdogen et al. | 277/630 |
| 5,904,676 | A * | 5/1999 | Van Driel | 604/403 |
| 5,906,740 | A * | 5/1999 | Brown et al. | 210/450 |
| 5,944,323 | A * | 8/1999 | Cavka | 277/626 |
| 5,972,063 | A * | 10/1999 | Dudrey et al. | 55/485 |
| 5,984,109 | A * | 11/1999 | Kanwar et al. | 210/440 |
| 6,063,276 | A * | 5/2000 | Felber | 210/315 |
| 6,096,207 | A * | 8/2000 | Hoffman et al. | 210/232 |
| 6,096,208 | A * | 8/2000 | Connelly et al. | 210/249 |
| 6,099,726 | A * | 8/2000 | Gembolis et al. | 210/243 |
| 6,099,729 | A * | 8/2000 | Cella et al. | 210/315 |
| 6,105,789 | A * | 8/2000 | Boast | 210/495 |
| 6,113,784 | A * | 9/2000 | Stoyell et al. | 210/493.2 |
| 6,126,823 | A * | 10/2000 | Soderlund et al. | 210/206 |
| 6,143,106 | A * | 11/2000 | Shane | 156/69 |
| 6,202,859 | B1 * | 3/2001 | Langsdorf et al. | 210/443 |
| 6,214,215 | B1 * | 4/2001 | Berkey et al. | 210/130 |
| 6,217,763 | B1 * | 4/2001 | Lawrence et al. | 210/232 |
| 6,235,194 | B1 * | 5/2001 | Jousset | 210/206 |
| 6,269,956 | B1 * | 8/2001 | Wertz, II | 210/450 |
| 6,299,176 | B1 * | 10/2001 | Guzowski et al. | 277/604 |
| 6,328,883 | B1 * | 12/2001 | Jensen | 210/136 |
| 6,329,625 | B1 * | 12/2001 | Quick et al. | 219/85.13 |
| 6,355,077 | B1 * | 3/2002 | Chittenden et al. | 55/385.3 |
| 6,471,071 | B1 * | 10/2002 | Shoaf et al. | 210/440 |
| 6,508,934 | B2 * | 1/2003 | Van Pelt et al. | 210/232 |
| 6,571,961 | B2 * | 6/2003 | Demirdogen | 210/443 |
| 6,571,962 | B2 * | 6/2003 | Thomas | 210/457 |
| 6,579,348 | B1 * | 6/2003 | Winter et al. | 95/273 |
| 6,588,602 | B1 * | 7/2003 | McKenzie | 210/443 |
| 6,652,614 | B2 * | 11/2003 | Gieseke et al. | 55/498 |
| 6,652,615 | B2 * | 11/2003 | Quick et al. | 55/502 |
| 6,666,968 | B2 * | 12/2003 | Smith et al. | 210/254 |
| 6,706,087 | B1 * | 3/2004 | Gebler et al. | 55/492 |
| 6,823,996 | B2 * | 11/2004 | Durre | 210/443 |
| 6,830,683 | B2 * | 12/2004 | Gundrum et al. | 210/232 |
| 6,835,304 | B2 * | 12/2004 | Jousset et al. | 210/85 |
| 6,875,342 | B2 * | 4/2005 | Shane | 210/85 |
| 6,911,144 | B2 * | 6/2005 | Van Pelt et al. | 210/232 |
| 6,932,907 | B2 * | 8/2005 | Haq et al. | 210/433.1 |
| 6,991,112 | B2 * | 1/2006 | Ham | 210/450 |
| 7,051,904 | B2 * | 5/2006 | Jeter | 222/189.11 |
| 7,083,661 | B2 * | 8/2006 | Hasegawa et al. | 55/498 |
| 7,172,697 | B2 * | 2/2007 | Chikura et al. | 210/321.83 |
| 7,210,584 | B2 * | 5/2007 | Wnuk et al | 210/484 |
| D548,307 | S * | 8/2007 | Reynolds et al. | D23/209 |
| 7,267,770 | B2 * | 9/2007 | White et al. | 210/282 |
| 7,455,707 | B2 * | 11/2008 | Engel et al. | 55/428 |
| 7,473,360 | B2 * | 1/2009 | Hoffman et al. | 210/236 |
| 7,524,349 | B2 * | 4/2009 | Schrage et al. | 55/502 |
| 7,740,679 | B2 * | 6/2010 | Ehrenberg | 55/498 |
| 7,771,595 | B2 * | 8/2010 | Reynolds et al. | 210/232 |
| 7,815,198 | B2 * | 10/2010 | Tani | 277/644 |
| 7,850,755 | B2 * | 12/2010 | Krull et al. | 55/498 |
| 7,854,434 | B2 * | 12/2010 | Heiman et al. | 277/644 |
| 7,975,870 | B2 * | 7/2011 | Laule et al. | 220/582 |
| 7,981,186 | B2 * | 7/2011 | Schrage et al. | 55/498 |
| 7,998,353 | B2 * | 8/2011 | Vandendijk et al. | 210/767 |
| 8,114,278 | B2 * | 2/2012 | Lorente et al. | 210/188 |

| | | | |
|---|---|---|---|
| 8,128,819 B2 * | 3/2012 | Beard et al. | 210/235 |
| 8,241,493 B2 * | 8/2012 | Beard et al. | 210/238 |
| 8,361,181 B2 * | 1/2013 | Osendorf et al. | 55/498 |
| 2002/0011440 A1 * | 1/2002 | Quick et al. | 210/493.2 |
| 2004/0068970 A1 * | 4/2004 | Hasegawa et al. | 55/498 |
| 2004/0188345 A1 * | 9/2004 | Wnuk et al. | 210/436 |
| 2004/0206691 A1 * | 10/2004 | Charin et al. | 210/493.1 |
| 2009/0283481 A1 * | 11/2009 | Vandendijk et al. | 210/767 |
| 2010/0230340 A1 * | 9/2010 | Bielawski et al. | 210/198.2 |
| 2011/0006015 A1 * | 1/2011 | Leonard et al. | 210/767 |
| 2013/0025246 A1 * | 1/2013 | Burns et al. | 55/498 |

FOREIGN PATENT DOCUMENTS

| | | | |
|---|---|---|---|
| EP | 1354617 A1 * | 10/2003 | |
| EP | 1872839 A1 | 1/2008 | |
| JP | 04322707 A * | 11/1992 | |
| WO | 90/00434 | 1/1990 | |
| WO | 02/057035 A1 | 7/2002 | |
| WO | 03/020396 A1 | 3/2003 | |
| WO | 2005/099863 A1 | 10/2005 | |
| WO | 2005/099864 A1 | 10/2005 | |
| WO | 2005/099940 A1 | 10/2005 | |
| WO | WO 2009109435 A1 * | 9/2009 | |

OTHER PUBLICATIONS

International Search Report in PCT/EP2009/051149, May 8, 2009.

* cited by examiner

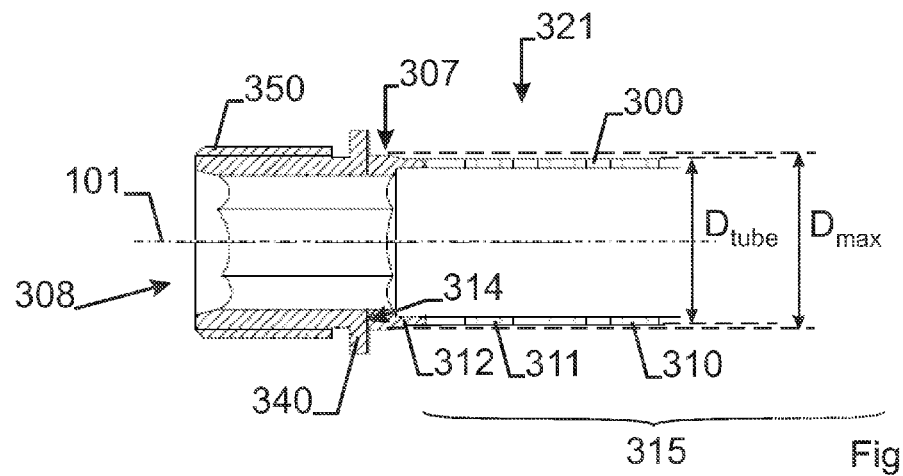
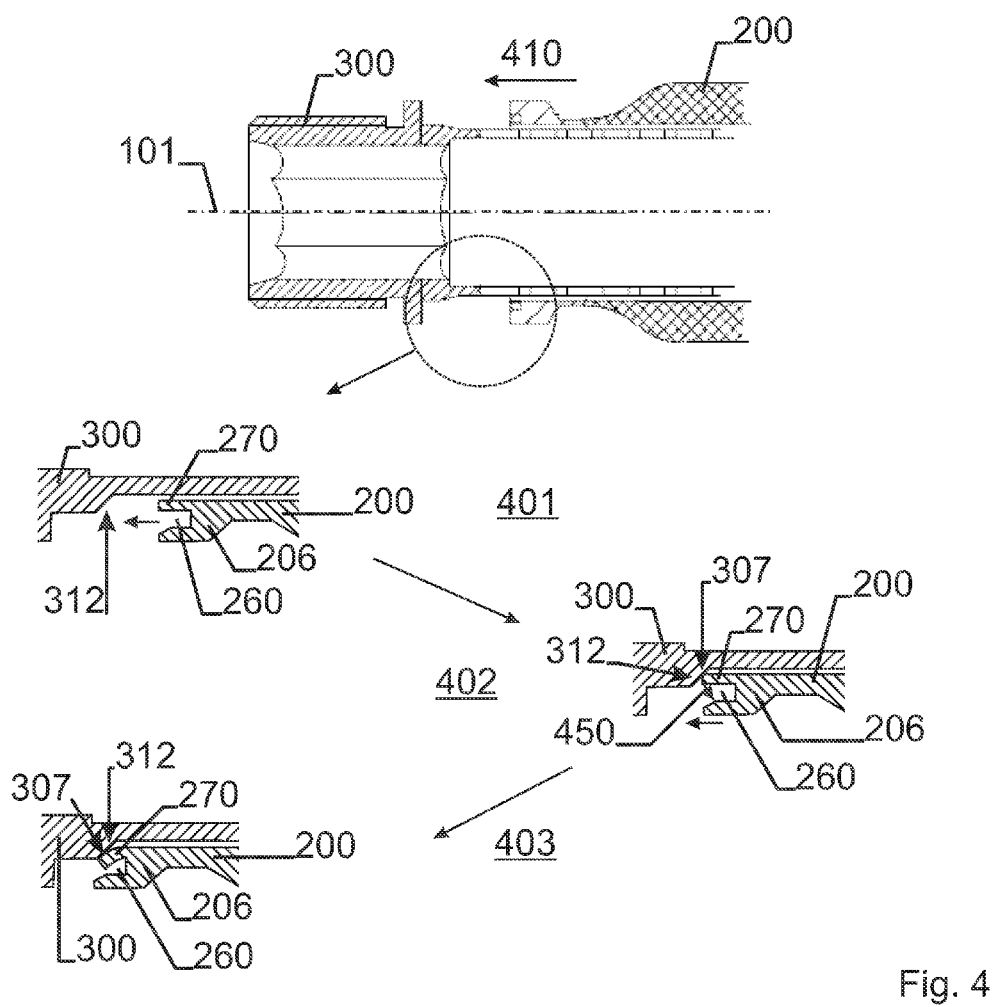
Fig. 4

FILTER CANDLE AND MESH PACK WITH A DEFORMABLE SEAL, AND METHOD OF FILTERING MOLTEN OR DISSOLVED POLYMERS

TECHNICAL FIELD OF THE INVENTION

The present invention relates to filtration devices, more particularly to filter candles and mesh packs being part of a candle filter apparatus for filtration of fluids such as liquids, e.g. polymer filtration. The present invention also relates to methods of manufacture and use of such filtration devices.

BACKGROUND OF THE INVENTION

Various filtration devices are known to filter polymers, e.g. molten or dissolved polymers, for example prior to spinning filaments from the molten or dissolved polymer using a spin pack or spinneret.

The filtration devices for polymer filtration usually comprise filter candles, also named candle filters or tubular filters.

A filter candle apparatus for polymer filtration is disclosed in U.S. Pat. No. 5,279,733. The filter candles comprise small interstices between different paths of the filter candle, e.g. small interstices between the bearing and the mesh pack end fitting or in the small interstices between the core tube and the bearing and end fitting.

The filter candle, which is to filter polymer "outside-in", has some disadvantages. Usually, high pressure is used during filtration, e.g. process pressures in the range of 200 bar to 500 bar, and using pressure drops over the filter candle of up to 150 bar, which pressures are necessary due to the high viscosity of the polymer fluid, e.g. about 100 Pa*s to 1000 Pa*s. Due to this pressure, some polymer is forced to flow in the small interstices between the bearing and the mesh pack end fitting or in the small interstices between the core tube and the bearing and end fitting. The polymer, which is pressed in the interstices, will no longer flow and harden, causing the polymer to become brittle, usually blackened. After some time, the brittle polymer will loosen and create hard polymer particles in the polymer fluid. The interstices are located at the clean, filtrate side of the filter membrane. So the polymer particles, which are created at these interstices, will flow along with the filtered polymer, and may cause problems in the further process, which uses the filtered polymer. E.g. it may cause spinnerets to be partially clogged, or it may create black contamination in polymer articles using the filtered polymer.

One way to at least partially avoid this black contamination due to hardened polymer particles is the use of a filter candle as disclosed in EP-A1-1872839. A ring-shaped seal is provided between the outer end surface of the core tube and the inner end surface and the end flange of the end fitting, which seal is a porous seal structure, whose pores having an average pore size equal or less than the filter rating of the filter medium of the mesh pack. The provision of such porous seals is expensive, in particular since the seals, made from expensive metal powders or fibres, are often disposed after a single use.

SUMMARY OF THE INVENTION

It is an object of embodiments of the present invention to provide good filter candles and elongate mesh packs, as well as a method of making them.

The above objective is accomplished by an elongate mesh pack according to embodiments of the present invention and by a filter candle comprising an elongate mesh pack according to embodiments of the present invention.

In a first aspect, the present invention provides an elongate mesh pack for filtering a fluid. The elongate mesh pack defines a mesh pack axial opening. The mesh pack comprises a filter medium for filtration of the fluid. The mesh pack has an end fitting securely fixed to the filter medium, the end fitting providing a first extremity of the mesh pack. The end fitting has an inner surface defining an end fitting opening through the end fitting, the end fitting opening being co-axial with the axial opening of the mesh pack. The end fitting comprises an annular recess encompassing the end fitting opening. A partition wall suitable to deform towards the recess under radial force is provided between the recess and the end fitting opening. The partition wall provides or forms at least part of the inner surface.

The partition wall thus has a first surface providing at least part of the surface of the end fitting oriented inwards the end fitting opening, a second surface of the partition wall being oriented towards the recess.

The partition wall forms a lip or edge. The partition wall is made suitable to be bent towards the recess under radial forces.

The thickness of the partition wall, i.e. the maximum distance between the two outer surfaces of the partition wall in radial direction, i.e. the direction substantially perpendicular to the axial direction, is such that the partition wall can be elastically deformed into the recess under radial force.

In embodiments of the present invention, the recess may be a slit, i.e. a long narrow cut or opening. In alternative embodiments, the recess may have any other suitable shape, e.g. a slit provided with supplementary cuts, e.g. at sidewalls of the slit.

The recess may optionally have a substantially rectangular cross section according to a plane parallel to and comprising the axis of the mesh pack. The depth of the recess, which may be identical to the height of the partition wall in axial direction, may optionally be in a range of 1 mm to 10 mm. The width of the recess may optionally be less than the depth of the recess or less than the height of the partition wall in axial direction. The width of the recess may optionally be in the range of 0.5 mm to 5 mm, e.g. in the range of about 1 mm to 5 mm.

The mesh pack may be used to provide the filter medium of a filter candle, the filter candle further comprising a hollow core tube, e.g. comprising a fluid permeable wall, such as for example a perforated tube. The hollow core tube may be slideably moveable into the axial opening of the mesh pack. The hollow core tube may be provided with an end flange at one extremity, which may be brought into contact with the outer extremity of the end fitting of the mesh pack. When the hollow core tube is slid into the axial opening, the end surface of the core tube, optionally adjacent to the end flange, may deform the partition wall when the end surfaces of the core tube pushes the partition wall outwards in radial direction. This occurs when the diameter of the outer diameter of the core tube's end surface is at least slightly larger than the minimum diameter of part of the end fitting opening, which part is provided by the partition wall. When mounting the hollow core tube into the mesh pack, the partition wall is forced against the end surface of the core tube. The forces cause the partition wall to deform, and adapt its form to the end surface of the core tube, hence sealing the end fitting by means of the partition wall to the end surface of the core tube. As such the mesh pack and the core tube may become sealed one relative to the other, without the need to provide an additional seal between the end surface of the core tube and the end fitting opening.

In embodiments of the present invention, the deformation of the partition wall towards the recess is an elastic deformation. This has the advantage that the mesh pack and the hollow core tube can be repetitively sealed one to the other by means of the partition wall deformation. The filter candle, comprising such mesh pack and hollow core tube, after being used, e.g. saturated with filtered substance, may be dismounted, cleaned and mounted again, thus sealing the mesh pack and the hollow core tube again without the need to provide an additional seal.

A filter candle comprising an elongate mesh pack according to this aspect of the present invention may typically be used to filter fluids, e.g. liquids such as dissolved or melted polymer liquids, "outside-in". This means that the fluid to be filtered is provided to the outer side of the elongate mesh pack. The fluid flows first through the filter medium of the mesh pack, after which it is to flow through the core tube. Once flown through the fluid permeable wall of the core tube, the filtered fluid is evacuated from the inner volume of the core tube via the axial opening in the end fitting.

During use of the filter candle comprising an elongate mesh pack according to this aspect of the present invention, mounted on a core tube as set out above, a higher fluid pressure is present on the outer surface of the core tube as compared to the pressure at its inner side. As such, this pressure difference forces the partition wall of the end fitting of the mesh pack against the end surface of the core tube, thus assisting in creating a sealing effect by means of the deformation of the partition wall.

In an elongate mesh pack according to embodiments of the present invention, the partition wall may have a uniform thickness. This thickness may be in a range of about 0.2 mm to about 0.6 mm, e.g. in the range of about 0.4 mm to about 0.6 mm.

In an elongate mesh pack according to alternative embodiments of the present invention, the mesh pack may have a longitudinal direction wherein the partition wall has a thickness varying along the longitudinal direction. The thickness may vary between a minimum thickness and a maximum thickness. The thickness variation may be a stepwise thickness variation. Alternatively, the thickness variation may be a continuous thickness variation. Due to the thickness variation, a zone with increased weakness may be more easily provided, thus allowing the partition wall to bend.

If the partition wall has a thickness varying along the longitudinal direction, the partition wall may comprise at least a first annular zone and a second annular zone, the thickness of the first annular zone being less than the thickness of the second annular zone.

The first annular zone is so-to-say a bending zone. Due to the reduced thickness, the partition wall will deform preferentially at this first annular zone. The thickness of this first annular zone may optionally be in a range of about 0.2 mm to about 0.6 mm, e.g. in the range of about 0.4 mm to about 0.6 mm, whereas the thickness of the second annular zone may be more than 0.6 mm.

The first annular zone may optionally be located near the recess bottom.

In an elongate mesh pack according to embodiments of the present invention, the inner surface of the end fitting may be substantially cylindrical. In an elongate mesh pack according to alternative embodiments of the present invention, the inner surface of the end fitting may be substantially conical.

In a second aspect, the present invention provides a filter candle for filtering a fluid, the filter candle comprising an elongate mesh pack according to any one of embodiments of the first aspect. The filter candle further comprises a hollow core tube having a fluid permeable wall, the core tube being removably slidable through the mesh pack axial opening. The core tube has a first outer extremity having an extremity outer surface with a maximum diameter Dmax. The at least part of the inner surface of the end fitting provided by the partition wall has a minimum diameter Dmin less than the maximum diameter Dmax of the extremity outer surface.

The extremity outer surface, at the first extremity of the core tube, is a fluid impermeable zone of the wall of the core tube, which is suitable to be brought into contact with the inner surface of the end fitting of the elongate mesh pack. In particular, the extremity outer surface at the first extremity of the core tube is suitable to be slid into the mesh pack axial opening.

The difference between the maximum diameter Dmax of the extremity outer surface and the minimum diameter Dmin of the at least part of the inner surface of the end fitting provided by the partition wall may be in the range of 0.20 mm to 0.70 mm, for example in the range of 0.25 mm to 0.60 mm, for example about 0.44 mm or in the range of 0.7% to 2.4% of the maximum diameter Dmax of the extremity outer surface, for example in the range of 0.9% to 2.1% of the maximum diameter Dmax of the extremity outer surface.

The core tube may have an end flange fixed to the extremity outer surface.

Optionally the end flange may be suitable for engaging the end fitting of the mesh pack.

Optionally the core tube is provided with a coupling means suitable to couple the core tube, and as such the mesh pack coupled to the core tube and hence the complete filter candle, to a filtration device of which the filter candle may be part. In axial direction the core tube has an axial opening via which the fluid can enter into, or be evacuated from, the inner volume of the core tube.

In embodiments of the present invention, the core tube comprises an axial opening, and the extremity outer surface of the core tube may comprise at least one bevelled section.

The axial opening may be provided by the extremity outer surface, or by the end flange or a coupling means, depending on the part of the core tube that takes the outmost position in axial direction.

Optionally the bevelled section may contact an end flange fixed to the outer end surface.

In a third aspect, the present invention provides a filtration device comprising a filter candle as in any of the embodiments of the second aspect.

In a fourth aspect, the present invention provides the use of a filter candle according to embodiments of the second aspect of the present invention for filtration of molten or dissolved polymer.

In a fifth aspect, the present invention provides the use of an elongate mesh pack according to embodiments of the first aspect of the present invention for filtration of molten or dissolved polymer.

A filter candle comprising an elongate mesh pack as subject of the present invention has the advantage that it avoids dead zones in the filter candle where the fluid stagnates after filtering, especially at the outflow side of the filter medium. Some embodiments of filter candles comprising an elongate mesh pack in accordance with embodiments of the present invention reduce the risk of creation of brittle polymer particles at the outflow side of the filter candle's filter medium when being used to filter molten or dissolved polymer.

It is an advantage of embodiments of the present invention that the use of supplementary seals, in particular porous seals, may be avoided.

It is another advantage of embodiments of the present invention that filter candles according to some embodiments of the present invention can be disassembled and cleaned easily, in particular more easily than prior art filter candles.

It is another advantage of filter candles according to embodiments of the present invention that some elements of the filter candle, such as the end fitting of the mesh pack can be provided having a shape which is not very complex, requiring little machining. Moreover, there is no need for an extra gasket, hence defects and/or mechanical damage of such gaskets are avoided. This makes a filter candle according to embodiments of the present invention very reliable, optionally more reliable than prior art filter candles. An elongate mesh pack according to embodiments of the present invention is particularly suitable and adapted for filtering polypropylene with a filter rate of 40 μm. In distinction herewith, the elongate mesh pack of EP-A1-1872839 is particularly suitable for filtering polyester or polyamide with a filter rate of 20 μm.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teaching of the present invention permits the design of improved filter apparatuses for filtering fluids, especially to be used for filtration of viscous fluids, e.g. molten polymer or dissolved polymer. After disassembly of the filter apparatus comprising one or more filter candles with elongate mesh packs in accordance with embodiments of the present invention, a more efficient and complete cleaning can be obtained. Such more complete and efficient cleaning results in a longer life time of the whole filter apparatus, up to an increase of 20% to 30% in life time. It was also found that the production yield (throughput per $m^2$ per time unit) after cleaning of the filter apparatus is increased. Whereas for presently known filter apparatuses, cleaning of the apparatus results in a yield loss of about 20%, for apparatuses in accordance with embodiments of the present invention, the yield loss due to a cleaning operation is only up to 10%.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 3 shows details of a hollow core tube, which may be used in combination with the elongate mesh pack of FIG. 2.

In FIG. 4, by means of three consecutive views, the assembly is shown of an elongate mesh pack according to embodiments of the present invention and a core tube, by inserting the core tube in the mesh pack.

Figure 1:
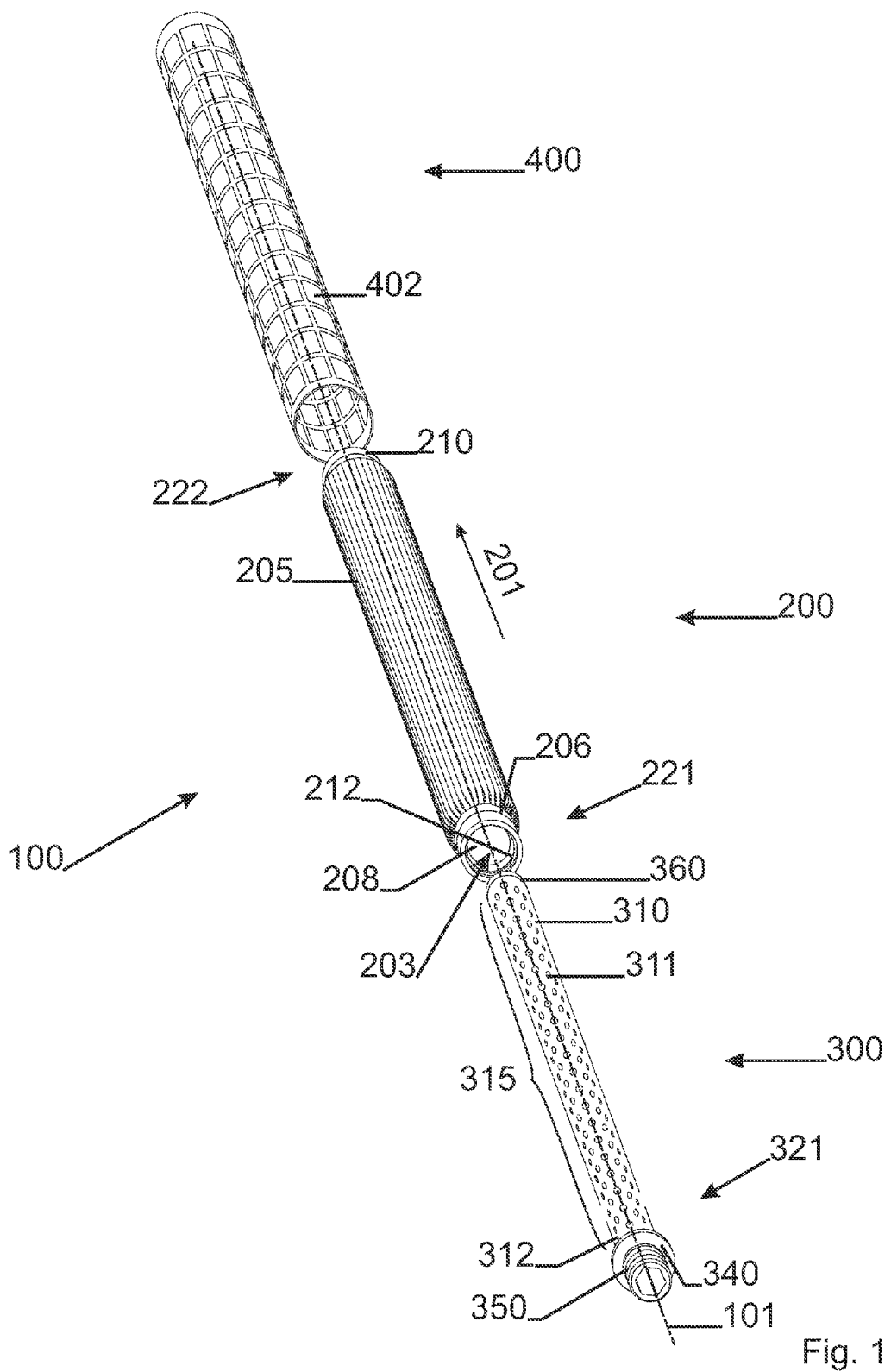
FIG. 1 schematically shows an assembly view of a filter candle comprising an elongate mesh pack according to an embodiment of this invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention. These definitions should not be construed to have a scope less than understood by a person of ordinary skill in the art.

The term "filter rating being x µm" is to be understood as "98.5% of the particles having an average diameter of x µm are retained". The filter rating is measured according to the standard ISO4572.

The term "porosity" P is to be understood as $P=100*(1-d)$ wherein d=(weight of 1 m$^3$ porous material)/(SF) wherein SF=specific weight per m$^3$ of the substance out of which the porous material is provided. As an example, the porosity of a sintered metal fiber product or sintered metal particle product is calculated as set out above, using "d" as the weight of 1 m$^3$ sintered metal fiber product or sintered metal powder product, and SF being the specific weight per m$^3$ of the alloy out of which the metal fibers are or metal powder is made.

The term "metal fiber" is to be understood as a fiber made of any metal or metal alloy. An example of a suitable alloy is a stainless steel alloy such as AISI316 or AISI316 e.g. AISI316L. Metal fibers may be provided by different suitable production processes such as e.g. a bundle drawing process according to U.S. Pat. No. 3,379,000, a coil shaving process such as known from EP-319959 or metal fibers provided by melt extraction such as described in U.S. Pat. No. 5,027,886.

Metal fibers are characterised by an equivalent diameter, for embodiments of the invention optionally in the range of 1 µm to 120 µm, such as in the range of 1 µm to 60 µm. The fibers may be endless long fibers (also referred to as filaments) or may be provided as staple fibers having an average length in the range of 1 mm to 90 mm. Optionally, the metal fibers are short metal fibers, obtained from for example by a method as described in WO 02/057035.

The term "filter medium" is to be understood as any medium, which is able to separate particles from a fluid. The particles may be liquid or solid. The filter media used for the present invention may be suitable for surface filtration as well as for depth filtration. Filter media optionally have a thickness in the range from 0.025 mm to 2 mm, and may have a porosity P in the range of 40% to 95%. Metal fibers may be used for the filter medium. Optionally, metal fibers may be blended with ceramic fibers and/or with ceramic powder and/or ceramic whiskers and/or metal powder. Optionally the particle diameter is less than ⅕ of the equivalent diameter of the fibers used. A medium being a combination of short metal fibers and staple metal fibers and/or metal powder may be used as well, e.g. a combination of short metal fibers and staple metal fibers, the combination comprising up to 20% in weight of staple metal fibers.

The filter media are optionally sintered filter media, especially in case the filtration medium comprises or consists of metal fibers or metal powder. Alternatively the filter medium may be a woven filter medium.

Metal fiber filter media may be provided by the methods as described in WO 2005/099863, WO 2005/099864 or WO 2005/099940. Optionally, the filter media may further comprise metal wires or metal expanded plates to reinforce the filter medium. Metal wires may be present as metal wire mesh or grid. Alternatively or additionally, the filter medium may comprise metal powder sheets, perforated sheets such as perforated synthetic sheets or expanded synthetic sheets.

The terms "substantially rectangular", "substantially conical" and "substantially cylindrical" are to be understood as allowing deviation from, respectively, a perfect rectangular, conical or cylindrical shape, due to, for example, normal production tolerances. Angular deviations or deviation on length dimensions of about plus or minus 3% are to be seen as normal production tolerances.

The invention will now be described by a detailed description of several embodiments thereof. It is clear that other embodiments of the invention can be configured according to the knowledge of persons skilled in the art without departing from the technical teaching of the invention as defined by the terms of the appended claims.

Figure 2:
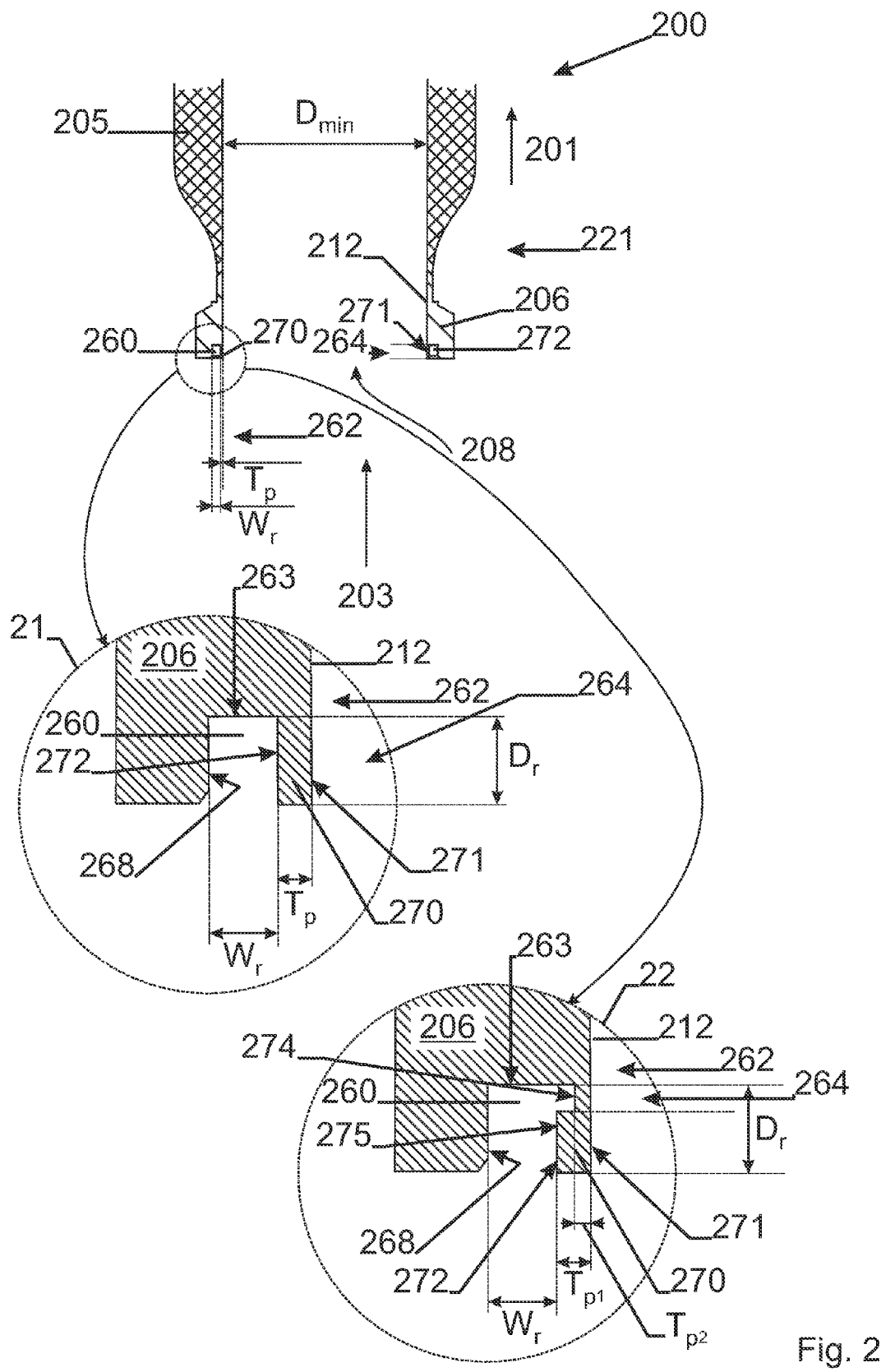
FIG. 2 shows details of the elongate mesh pack according to embodiments of the present invention.

FIG. 1 of the drawings is an exploded view of a filter candle 100 comprising an elongate mesh pack according to an embodiment of the present invention. FIG. 2 shows details of a mesh pack 200 according to an embodiment of the present invention. FIG. 3 shows details of a hollow core tube 300 which may be used in combination with the elongate mesh pack 200 according to embodiments of the present invention. In FIG. 4, by means of three consecutive views 401, 402 and 403, the assembly is shown of a mesh pack 200 according to embodiments of the present invention and a core tube 300, by insertion of the core tube 300 in the mesh pack 200.

As illustrated in FIG. 1, a filter candle 100 comprises at least two completely separable components, namely, an elongate mesh pack 200 and a core tube 300. In the embodiment illustrated, the mesh pack 200 and the core tube 300 are completed with a third completely separable component, i.e. a guard 400.

In the embodiment as shown in FIG. 1, the mesh pack 200 is an elongate mesh pack, elongate in a longitudinal direction 201 (coinciding with an axial direction of the filter candle). The mesh pack 200 defines a mesh pack axial opening 203. Although the diameter of the opening 203 is not considered a limitation of this invention, the opening can have, for example, a diameter ranging from 14 mm to 500 mm, such as ranging from 14 mm to 100 mm. The mesh pack 200 comprises a filter medium 205, which is preferably an accordion-like pleated medium having pleating lines substantially parallel to the longitudinal direction 201 of the mesh pack 200. With "substantially parallel" is meant that fabrication tolerances providing a small deviation from the parallel direction may be present. An end fitting 206 is securely fixed to a first extremity 221 of the mesh pack 200, also referred to as first axial extremity. The end fitting 206 has an inner surface 212 which defines an end fitting opening 208 through the end fitting 206 which is coaxial with the mesh pack axial opening 203 of mesh pack 200. At the second extremity 222, also referred to as second axial extremity, the filter medium 205, and hence the mesh pack 205, is closed by means of an end cap 210, which is fluid tightly fixed to the filter medium 205.

Details of an elongate mesh pack in accordance with embodiments of the present invention, of which the elongate mesh pack 200 in FIG. 1 is an example, are shown in FIG. 2.

The end fitting 206 of the mesh pack 200 is securely fixed to the filter medium 205. The end fitting opening 208 is co-axial with the axial opening 203 of the mesh pack 200. The end fitting 206 comprises an annular recess 260 encompassing the end fitting opening 208. A partition wall 270, suitable to deform towards the recess 260 under radial force is provided between the recess 260 and the end fitting opening 208. The radial forces are acting in a radial direction 262 perpendicular to the longitudinal direction 201.

The partition wall 270 provides at least a part 264 of the inner surface 212 of the end fitting 206. In this embodiment, the inner surface 212 of the end fitting 206 is substantially cylindrical.

The partition wall 270 thus has a first surface 271 providing at least part 264 of the surface 212 of the end fitting 206 oriented inwards the end fitting opening 208, a second surface 272 being oriented towards the recess 260.

The partition wall 270 forms so-to-say a lip or edge.

The partition wall 270 is made suitable to be bent towards the recess 260 under radial forces. For example, the thickness Tp of the partition wall 270, i.e. the maximum distance between the two surfaces 271 and 272 of the partition wall 270 in radial direction, is such that the partition wall 270 can be elastically deformed into the recess 260 under radial force. Details 21 and 22 show two possible options to provide a partition wall 270.

As shown in detail 21 in FIG. 2, the partition wall 270 may have a uniform thickness Tp. This thickness may be in a range of for example 0.2 mm to 0.6 mm, for example in the range of about 0.4 mm to about 0.6 mm, e.g. about 0.3 mm.

Alternatively, as shown in detail 22 in FIG. 2, the partition wall 270 may have a thickness which varies along the height of the partition wall, i.e. varying along the longitudinal direction 201 and having a minimum thickness and a maximum thickness. The minimum thickness of the partition wall 270 may optionally be provided at a distance from the coupling point of the partition wall 270 with the recess bottom 263, which distance has a value between zero and half the height of the partition wall 270. Optionally the thickness at the coupling point of the partition wall 270 with the recess bottom 263 equals the minimum thickness of the partition wall 270. Optionally the partition wall 270 may comprise at least a first annular zone 274 and a second annular zone 275, each of the two zones having a substantially uniform thickness. The first annular zone 274 may have a thickness Tp2, being the minimum thickness of the partition wall 270 and hence being less than the thickness Tp1, where the thickness Tp1 is the thickness of the second annular zone 275. The thickness Tp1 of the second annular zone 275 may equal the thickness Tp as in detail 21, being the maximum distance between the two outer surfaces 271 and 272 of the partition wall 270 in radial direction, or may even be larger. The thickness Tp2 of this first annular zone 274 may optionally be in a range of for example about 0.2 mm to 0.6 mm, e.g. about 0.4 mm to about 0.6 mm, such as e.g. about 0.5 mm, whereas the thickness of the second annular zone 275 may be more than 0.6 mm, e.g. about 0.8 mm.

The first annular zone 274 is located near the recess bottom 263 of the recess 260, hence the thickness at the coupling point of the partition wall 270 with the recess bottom 263 equals the minimum thickness of the partition wall 270.

In the embodiment shown in detail 22 of FIG. 2, the part of the surface 271 of the partition wall 270 provided by the first annular zone 274 remains coplanar with the part of the surface 271 of the partition wall 270 provided by the second annular zone 275. The surface 272 of the partition wall 270 shows an indentation at the first annular zone 274. In an alternative embodiment, the provision of a first annular zone 274 having a reduced thickness may be provided such that an indentation at the surface 271 of the partition wall 270 is present. In yet another alternative, a gradual change in thickness from Tp1 to Tp2 may be provided. In an alternative embodiment, the provision of a first annular zone having a reduced thickness may be provided such that indentations at both the surface 271 and surface 272 of the partition wall 270 are present.

The recess 260 forms a slit, i.e. a long narrow cut or opening. The recess may have a substantially rectangular cross-section according to a plane parallel to and comprising the axis 101 of the mesh pack 200. At the entrance of the slit, the surface 268 opposite to the partition wall 270 may be bevelled. The depth Dr of the recess, in this embodiment equal to the height of the partition wall in axial direction, may be in a range of about 1 mm to about 10 mm, e.g. about 1 mm to about 5 mm or about 2 mm to about 5 mm, such as about 1.9 mm. The width Wr of the recess may be less than the depth Dr of the recess. The width Wr of the recess may be in a range of about 0.5 mm to about 8 mm, e.g. about 1 mm to about 5 mm, such as about 1.18 mm. The part 264 of the inner surface 212 of the end fitting 206 provided by the partition wall 270 has a minimum diameter Dmin in a range of about 10 mm to about 50 mm, such as e.g. about 28.3 mm.

The filter candle 100 of FIG. 1 further comprises a hollow core tube, such as, as an example, hollow core tube 300, of which details are shown in FIG. 3.

The hollow core tube 300 has a fluid permeable wall 310 and comprises a number of apertures 311, e.g. slits or holes, provided in a fluid permeable section 315 of the hollow core tube 300. At a first extremity 321, the core tube 300 has an extremity outer surface 312, which extremity outer surface 312 is not fluid permeable, e.g. since no perforations are present. The core tube 300 has an end flange 340, which is fixed to the extremity outer surface 312, e.g. along an outer end axial brim 314. This end flange 340 extends outwards the core tube 300 and may be adapted to engage end fitting 206 of mesh pack 200, preferably in a flush manner.

The core tube 300 further comprises a coupling means 350, extending from end flange 340 of core tube 300, which coupling means 350 can be any suitable coupling such as a bayonet coupling or can be threaded to couple with other components. In the embodiment illustrated in FIG. 3, an axial opening 308 is provided to the core tube by this coupling means 350.

The core tube 300 provides internal support for filter candle 100.

The core tube 300, in particular the porous wall or fluid permeable section 315 and the extremity outer surface 312, is slidably positionable within mesh pack 200 through the mesh packs end fitting 206 and may be slidably removed from the mesh pack 200 in a similar, but opposite direction, as will be further described in relation to FIG. 4. The second extremity of the core tube 300 is closed by a closing means, e.g. an end cap 360.

The fluid permeable wall 310, extremity outer surface 312, end flange 340 and coupling section 350 may be provided by separate, individual components which are coupled to each other in any appropriate way, or may be provided as portions of one integral component, or may be provided in any other suitable combination of components.

The extremity outer surface 312 of the core tube 300 comprises a bevelled section 307, which has a higher thickness towards the axial opening 308 than towards the fluid permeable section 315. The maximum diameter Dmax of the core tube 300 at the extremity outer surface 312 is in that case larger than the tube diameter Dtube at the fluid permeable section 315. Optionally, the bevelled section 307 contacts with the end flange 340 fixed to the outer end surface 312 of the core tube 300.

The maximum diameter Dmax of the core tube 300 at the extremity outer surface 312 may be in the range of 10.4 mm to 50.5 mm, such as about 28.74 mm. The part 264 of the inner surface 212 of the end fitting 206 provided by the partition wall 270 thus has a minimum diameter Dmin which is larger than the tube diameter Dtube of the core tube 300, but less than the maximum diameter Dmax of the extremity outer surface 312 of the core tube 300.

The difference between the maximum diameter Dmax of the extremity outer surface 312 and the minimum diameter Dmin of the part of the inner surface 212 of the end fitting 206, provided by the partition wall 270, may be in the range of 0.20 mm to 0.70 mm, for example in the range of 0.25 mm to 0.60 mm, for example about 0.44 mm or in the range of 0.7% to 2.4% of the maximum diameter Dmax of the extremity outer surface 312, for example in the range of 0.9% to 2.1% of the maximum diameter Dmax of the extremity outer surface.

As an example according to a preferred embodiment, a mesh pack 200 is provided comprising a filter medium 205. The mesh pack 200 has a longitudinal length of 1300 mm and is provided at its first extremity 221 with an end fitting 206 being made of stainless steel, such as AISI 304 or AISI 316, and having an inner diameter of between 15 mm to 50 mm. The inner surface 212 of the end fitting 206 is substantially cylindrical and has a total height of about 50 mm. At the second extremity 222, the mesh pack 200 is closed by any suitable means, e.g. using a commonly available end cap. The filter medium 205 may be a variety of metal weaves or sintered metal media 205. Preferably, in this particular embodiment the filter medium is a medium having a filter rating of 60 μm, such as sintered metal fiber medium Bekipor® 60AL3 of NV BEKAERT SA or a woven wire mesh Multipor™ 60 of Bekaert Advanced Filtration.

The core tube 300 is a core tube made from perforated steel, and has an inner diameter of between 15 mm and 20 mm and an outer diameter of between 20 mm and 30 mm, e.g. about 24.1 mm. At a first extremity 321, the core tube is not perforated but impermeable along a length of between 500 mm and 2500 mm, e.g. about 1200 mm, measured in longitudinal direction starting from the end flange 340, which end flange 340 is coupled to this first extremity 321. The end flange 340 has diameter of about 50 mm. The second extremity 322 of the core tube may be closed in a conventionally known way.

As illustrated in the embodiments of FIG. 1, an outer guard 400 may be provided. Outer guard 400, provided from solid material e.g. provided from steel such as stainless steel, is to receive mesh pack 200 such that mesh pack 200 fills the inner space defined by guard 400. The guard 400 is fluid permeable and comprises apertures 420. The guard is to provide mechanical strength by means of outer support to the filter candle. A screw (not shown) may be provided for securing core tube 300, mesh pack 200 and outer guard 400 to each other.

Outer guard 400, elongate mesh pack 200 and hollow core tube 300 may be coaxially mounted, coaxial with regard to an axis 101, which axis is parallel to the longitudinal direction 201.

The mesh pack may be used to provide the filter medium of a filter candle, as shown in FIG. 4. The hollow core tube 300 is slideably moveable into the axial opening of the mesh pack 200. The hollow core tube 300 is slid into the axial opening of the elongate mesh pack 200, as shown in situation 401.

Upon contacting of the partition wall 270 of the end fitting 206 with the extremity outer surface 312 of the core tube 300, in this embodiment by contacting against the bevelled section 307 as shown in situation 402 of FIG. 4, the partition wall 270 will deform when the end surface 312 of the core tube 300 pushes the partition wall 270 outwards (as indicated with reference 450) in radial direction. This happens since the outer diameter of the core tube's extremity outer surface 312 is at least slightly larger than the minimum diameter of part 264 of the end fitting opening 208, which part 264 is provided by the partition wall 270.

When the elongate mesh pack 200 and core tube 300 are slid into each other to its farthest extent, as shown in situation 403, the partition wall 270 is forced against the end surface 312 of the core tube 300, in particular in the embodiment illustrated the bevelled section 307. The forces cause the partition wall to remain deformed, i.e. bent towards the recess 260, and sealing the end fitting 206 by means of the partition wall 270 to the end surface 312 of the core tube 300. It is an advantage of embodiments of the present invention that no sealing ring at the level of the end fitting 206 is necessary for providing an adequate sealing between the core tube 300 and the end fitting 206, thus alleviating an expensive component.

The deformation of the partition wall 270 towards the recess 260 is an elastic deformation. This has the advantage that the mesh pack 200 and the hollow core tube 300 can be repetitively sealed one to the other by means of the partition wall deformation, each time coming to a situation as shown in situation 403 in FIG. 4.

The filter candle, comprising at least such mesh pack 200 and hollow core tube 300, after being used, e.g. when used for filtering a liquid of dissolved or molten polymer material, may be dismounted, cleaned and mounted again, thus sealing the mesh pack and the hollow core tube again without the need to provide an additional seal. The dismounting may be performed by unfastening a fixing means keeping core tube and mesh pack together. Such fixing means may for example be a screw.

It is to be understood that although preferred embodiments, specific constructions and configurations, as well as materials, have been discussed herein for devices according to the present invention, various changes or modifications in form and detail may be made without departing from the scope of this invention as defined by the appended claims.

What is claimed:

1. An elongate mesh pack for filtering a fluid, comprising:
an elongated cylindrical mesh filter medium for filtration of the fluid, an end of which defines an axial opening; and
an end fitting being securely fixed to the filter medium, providing a first extremity of the mesh pack, and having an inner surface defining an end fitting opening through the end fitting, said end fitting opening being co-axial with the axial opening of the mesh pack, the end fitting comprising an annular recess encompassing the end fitting opening, wherein an axially extending partition wall made of a material capable of deforming towards the recess under radial force, is provided between the recess and the end fitting opening, the partition wall defining at least part of the inner surface;
wherein said partition wall deforms against a beveled extremity outer surface of a core tube when such a core tube is slidably moved into said axial opening of the elongate mesh pack, thereby fluidically sealing the end fitting to the core tube.

2. The elongate mesh pack according to claim 1, wherein the partition wall has a uniform thickness.

3. The elongate mesh pack according to claim 1, wherein the partition wall has a thickness varying along said axially extending direction.

4. The elongate mesh pack according to claim 3, wherein the partition wall comprises at least a first annular zone and a second annular zone, the thickness ($T_{p2}$) of the first annular zone being less than the thickness ($T_{p1}$) of the second annular zone.

5. The elongate mesh pack according to claim 1, wherein the inner surface of the end fitting is substantially cylindrical.

6. The elongate mesh pack according to claim 1, wherein the inner surface of the end fitting is substantially conical.

7. A filter candle for filtering a fluid, the filter candle comprising:
an elongated cylindrical mesh filter medium for filtration of the fluid, an end of which defines an axial opening;
an end fitting being securely fixed to the filter medium, providing a first extremity of the mesh pack, and having an inner surface defining an end fitting opening through the end fitting, said end fitting opening being co-axial with the axial opening of the mesh pack, the end fitting comprising an annular recess encompassing the end fitting opening, wherein an axially extending partition wall made of a material capable of deforming towards the recess under radial force, is provided between the recess and the end fitting opening, the partition wall defining at least part of the inner surface;
a hollow core tube having a fluid permeable wall and an axial opening, the core tube being removably slidable through the mesh pack axial opening;
the core tube having a first outer extremity having an extremity outer surface having a maximum diameter ($D_{max}$), and
the at least part of an inner surface of the end fitting defined by the partition wall having a minimum diameter ($D_{min}$) less than the maximum diameter ($D_{max}$) of the extremity outer surface;
wherein said partition wall deforms against a beveled extremity outer surface of a core tube when said core tube is slidably moved into said axial opening of the elongate mesh pack, thereby fluidically sealing the end fitting to the core tube.

8. The filter candle according to claim 7, wherein the core tube has an end flange fixed to the extremity outer surface.

9. A method of filtering comprising the steps of:
providing an elongate mesh pack as recited in claim 1 or a filter candle as recited in claim 7; and
passing a molten or dissolved polymer through said mesh pack or said filter candle to remove impurities from said polymer.

* * * * *